Aug. 7, 1962     W. A. WILLIAMSON     3,048,366
LIFT LINKAGE FOR LOW PLATFORM HAND TRUCKS
Filed Sept. 29, 1958     3 Sheets-Sheet 1

INVENTOR.
WILLIAM A. WILLIAMSON
BY
ATTORNEY.

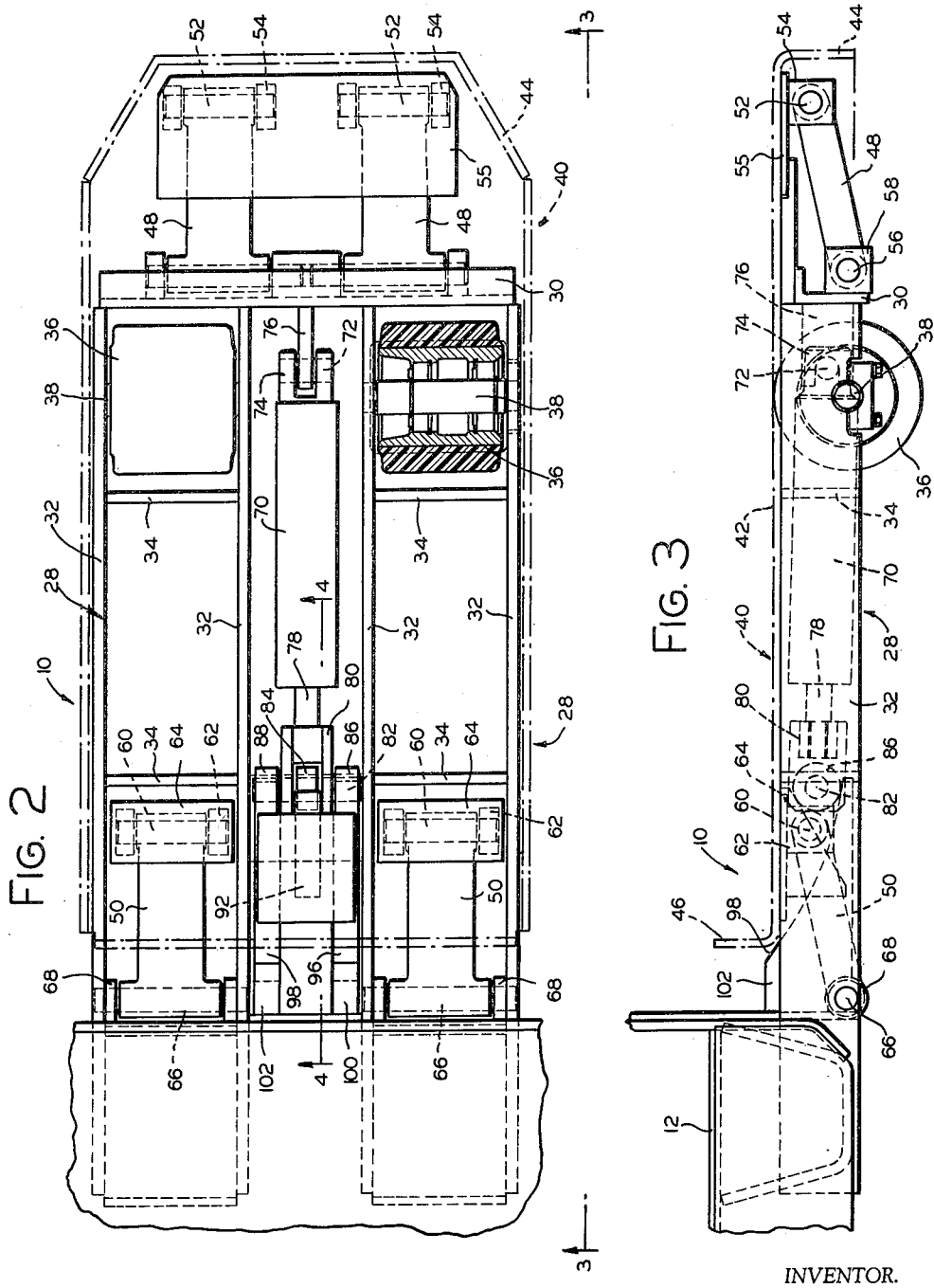

Aug. 7, 1962 W. A. WILLIAMSON 3,048,366
LIFT LINKAGE FOR LOW PLATFORM HAND TRUCKS
Filed Sept. 29, 1958 3 Sheets-Sheet 3

INVENTOR.
WILLIAM A. WILLIAMSON
BY
ATTORNEY.

United States Patent Office 3,048,366
Patented Aug. 7, 1962

3,048,366
LIFT LINKAGE FOR LOW PLATFORM
HAND TRUCKS
William A. Williamson, Battle Creek, Mich., assignor to
Clark Equipment Company, a corporation of Michigan
Filed Sept. 29, 1958, Ser. No. 764,043
4 Claims. (Cl. 254—5)

This invention relates generally to improvements in self-propelled hand lift trucks, and, more specifically, is directed to an improved lifting linkage and arrangement of operating means therefor.

One form of hand operated lift truck, known in the art, comprises a main frame which is supported by a plurality of wheels consisting of a single load supporting steering wheel at one end and a pair of load supporting trailing wheels at the opposite end thereof. Supported upon the main frame is a load supporting platform which is movable vertically upwardly and downwardly relative to the main frame by means of a parallelogram linkage arrangement wherein the platform is attached to the main frame by means of pivotally mounted links located at each end of the platform and having the one ends thereof secured to the platform and the opposite ends pivotally mounted to the main frame. The force required for lifting a load upon the platform is derived from a pivotally mounted hydraulic cylinder, one end of which is attached to the main frame and the opposite end of which is attached to the movable platform. The hydraulic cylinder is usually mounted in such a manner as to oppose the angle which the links make relative to the horizontal.

In the above mentioned type of hand truck it is desirable to have adequate floor clearance beneath the main frame while maintaining the load supporting platform relatively close to the supporting surface or floor when the platform is in its lowered position. Thus, it is necessary to provide small angles between the links and a horizontal plane which passes through the connections of the links to the main frame. The amount of force which the hydraulic cylinder must produce is a function of the angles that the links and the cylinder make relative to the horizontal, that is, the smaller the angle, the greater the force required. As the load is lifted, the angles which the links make relative to the horizontal increase, thus, the force required to be exerted by the hydraulic cylinder decreases.

As is evident from the foregoing brief description, the prior art arrangement is extremely inefficient in that it does not utilize the full potential of the hydraulic cylinder throughout the lifting cycle. Another factor tending to contribute to the inefficiency of the prior art construction; as aforesaid, lies in the fact that the hydraulic cylinder must lift a predetermined load in a predetermined distance with a relatively short stroke. This means that the cylinder must produce a relatively high force through the first portion of the lifting cycle.

As an example of the inefficiency of such an arrangement, let it be assumed that it is desired to produce a platform type of hand truck having a load lifting capacity requiring the cylinder to exert a constant force of, for example, 5,000 pounds, and that the load is to be lifted through a height of four inches. According to the prior art, it may be necessary to provide a hydraulic cylinder capable of exerting an initial force in the order of, for example, 10,000 pounds, and as the load is lifted the force required to be exerted by the cylinder will decrease (as the angles of the links increase) until near the end of the cylinder stroke the actual force required to be exerted in order to maintain the load lifting capacity may be reduced to, for example, 2,000 pounds. Thus, for a given load lifting capacity, it has been necessary to provide hydraulic cylinders of substantially greater size and capacity than should be necessary. As a result, the other components necessary to the operation of the cylinders, such as hydraulic pumps, control valves, and pressure fluid conducting lines, have necessarily been required to be of increased capacity. The overall result has been, therefore, a relatively costly and cumbersome structure which, inherently, is very inefficient to operate.

With the foregoing in mind, it is a very important object of the present invention to produce a load lifting mechanism for a hand lift truck by means of which a predetermined load may be lifted on the truck platform through the medium of hydraulic means which preferably operates at a substantially constant pressure throughout the lift cycle.

It is proposed to accomplish the above stated object by a new and novel placement and arrangement of operating means for the hydraulic cylinder relative to the main frame, the load supporting platform and the parallelogram lifting links. To that end, the hydraulic cylinder is pivotally mounted to the main frame. The opposite end of the cylinder is provided with a fixed crossshaft upon which are mounted a plurality of rollers. The rollers are adapted and arranged to contact and cooperate with a plurality of cams, certain of which are fixed to the main frame and certain of which are fixed to the load supporting platform. As the hydraulic cylinder is extended, the rollers engage the cams and force them apart, thus lifting the load supporting platform relative to the main frame. The arrangement and shape of the cam surfaces have a pronounced effect upon the force required to be exerted by the hydraulic cylinder and, therefore, they may be adapted and arranged so as to maintain the force constant throughout the lift cycle, or, for that matter, vary the force in accordance with a predetermined selected schedule.

It is a further object of the present invention to provide a load lifting mechanism for a hand lift truck which is of sturdy construction, is economical to manufacture, and which is simple, efficient, and reliable in operation.

The above and other objects and advantages of the present invention will become more readily apparent from the following detailed description of an illustrative embodiment thereof when taken in conjunction with the accompanying drawings forming a part hereof and wherein:

FIGURE 2 is a partial top plan view of the truck substantially as viewed along the line 2—2 of FIG. 1 with portions thereof being broken away and the load supporting platform being shown in phantom lines to more clearly show the general arrangement of the platform actuating linkage of the present invention;

FIGURE 3 is a partial side elevational view of the truck substantially as seen along the line 3—3 of FIG. 2;

Figure 1:
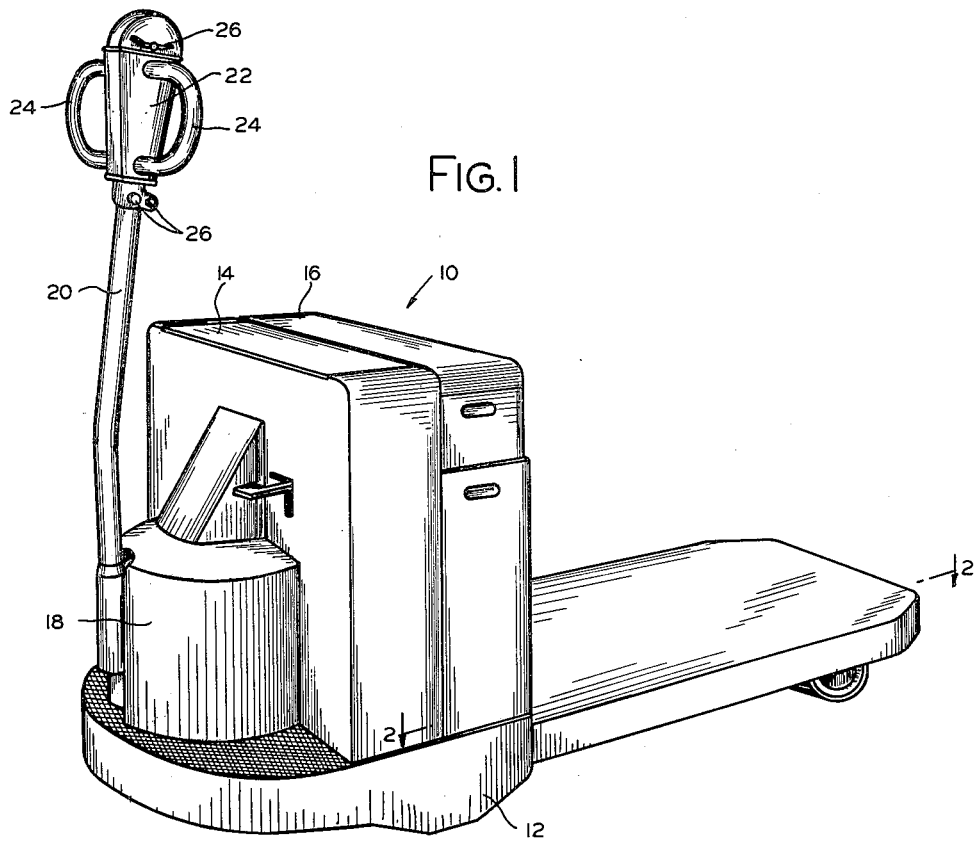
FIGURE 1 is a perspective view showing the general arrangement of a hand lift truck of the low platform type to which the present invention may be applied.

Referring to the drawings, there is shown in FIG. 1 a hand lift truck, indicated generally by the reference numeral 10, having a horizontally extending main frame 12. A pair of housing members 14 and 16 are mounted upon the main frame 12 and are, respectively, provided for enclosing the hydraulic fluid system which controls the load elevating mechanism, to be described hereinafter, and the batteries which supply power for operating various components of the truck 10.

The main frame 12 may be supported, in a conventionl manner, by means of a single motor operated steering and driving wheel (not shown) which is located directly beneath a housing member 18 which encloses certain of the operating elements therefor. Suitably mounted relative to the main frame 12, adjacent the housing member 18, is a tubular steering handle 20. Mounted to the upper end of the steering handle 20 is a steering head 22 which has mounted adjacent each side thereof a pair of aligned laterally projecting U-shaped hand grips 24. Conveniently disposed about the steering head 22 are a plurality of operating elements 26 which are adapted to be manipulated for starting and stopping the truck 10, and for operating the various hydraulic devices associated therewith. Control lines, connecting the various hydraulic devices and the prime mover of the truck 10 are disposed within the tubular steering handle 20.

The above described structure is generally typical of a number of various designs of hand lift trucks, known in the art, and detailed description of the various elements is not deemed necessary herein in order to obtain an understanding of the present invention.

As may be seen upon inspection of FIGS. 2 and 3, the main frame 12 has rigidly secured thereto, at its forward edge, a pair of spaced forwardly projecting load supporting frames generally indicated at 28 which form extensions of the main frame 12 and are tied together at their forward ends by a transverse angle frame member 30 to form a rigid, unitary structure. The frames 28 each generally comprise a pair of side plates 32 which are secured together in laterally spaced relationship by means of transversely extending plates 34. The entire frame structure above described may be secured together conveniently by means of welding or by any other suitable means.

The load supporting frames 28 are each supported adjacent their forward ends by means of suitable wheel and bearing assemblies 36 which are journaled for rotation upon axles 38 suitably mounted upon the side plates 32. Thus, the entire framework of the truck 10 comprising the main frame 12 and the load supporting frames 28 is supported for movement over the ground or other supporting surface by means of the single driving and steering wheel and the two wheels 36, which together form a tricycle type of support.

Mounted for vertical movement relative to the load supporting frames 28 is a conventional type of horizontally extending load supporting platform 40 consisting of a plate 42 having a downwardly turned flange 44 extending along the two sides and forwardly of and across the forward end of the load supporting frames 28. At its rearward end the plate 42 is provided with an upwardly turned transversely extending flange 46 which acts as a stop to limit the positioning of the load upon the platform 40.

The load supporting platform 40 is mounted for movement vertically and slightly longitudinally relative to the load supporting frames 28 by means of spaced pairs of pivotally connected links 48 and 50. The forward links 48 are each pivotally connected to the platform 40 at one end thereof by means of shafts 52 journaled within suitable bifurcated support elements 54 rigidly secured by means of a plate 55 to the platform 40. The opposite ends of the link 48 are pivotally connected to the load supporting frame structure by means of shafts 56 journaled within suitable bifurcated support elements 58 secured to the transverse angle frame member 30. In a like manner, the rearward links 50 are each pivotally connected to the platform 40 at one end thereof by means of shafts 60 journaled within suitable bifurcated support elements 62 rigidly secured by means of plates 64 to the platform 40. The opposite ends of the links 50 are pivotally connected to the load supporting frame structure by means of shafts 66 journaled within suitable bifurcated support elements 68 secured to the frame structure. The pivotal connection of the links 48 and 50 to the load supporting frame structure and to the platform 40 forms a parallelogram linkage arrangement which allows the platform to move vertically relative to the frame structure while maintaining its horizontal disposition. The platform 40 will also shift slightly longitudinally during its upward travel at which time the vertically extending flange 46 will move rearwardly toward the main frame 12 of the truck 10.

In order to accomplish the movement of the platform 40 relative to the load supporting frame structure, an hydraulically actuated cylinder and piston assembly 70 is provided. As may be seen, the forward end of the cylinder is pivotally connected to the load supporting frame structure by means of a shaft 72, a bifurcated support element 74 and a rigid link 76 which is secured to the approximate center of the transverse angle frame member 30. The piston rod 78 of the hydraulic cylinder and piston assembly 70 extends rearwardly thereof and terminates in a bifurcated support element 80 upon which is journaled a cross-shaft 82. The cross-shaft 82 carries three rollers 84, 86 and 88, the roller 84 being located centrally of the shaft between the legs of the bifurcated support element 80, and the rollers 86 and 88 being located transversely outwardly thereof as shown in FIG. 2.

The roller 84 is adapted and arranged to engage a rearwardly downwardly sloping surface 90 of a cam element 92 which is rigidly secured to the underside of the platform 40 by means of an integrally formed horizontally extending flange 94. The rollers 86 and 88 are adapted and arranged to contact, respectively, the rearwardly upwardly curving surfaces 96 and 98 of cam elements 100 and 102 which are rigidly secured to the load supporting frame structure, conveniently by welding.

Figure 4:
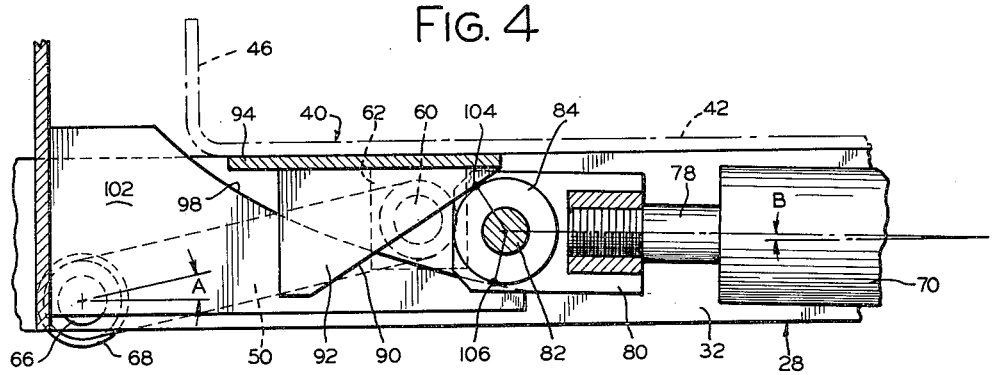
FIGURE 4 is an enlarged partial cross-sectional view taken substantially along the line 4—4 of FIG. 2 and shows in greater detail the structure and arrangement of the essential elements of the present invention with the load receiving platform in its lowermost position.
Figure 5:
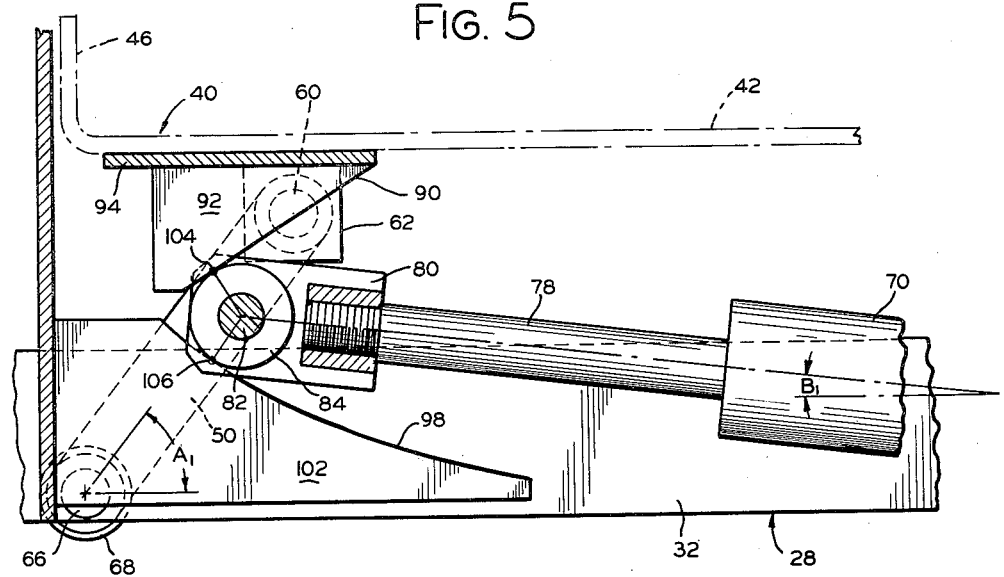
FIGURE 5 is a view similar to FIG. 4; but, shows the general relationship of the various elements with the load receiving platform in an elevated position.

As the piston rod 78 of the hydraulic cylinder and piston assembly 70 is extended, for example, from the position shown in FIG. 4 to the position shown in FIG. 5, the rollers 84, 86 and 88 will, respectively, engage the sloping surfaces 90, 96 and 98 of the cam elements 92, 100 and 102, thereby causing a wedging action tending to force the cams apart so that the platform 40 moves vertically upwardly and longitudinally relative to the load supporting frame structure on the one ends of the pivotally connected links 48 and 50.

The force exerted by the hydraulic cylinder and piston assembly 70 will be transmitted by rollers 84, 86 and 88 at the points of tangency thereof with the sloping surfaces of the cams engaged thereby. For example, the point of tangency of the roller 84 with the sloping surface 90 of the cam 92 is designated at 104 in FIGS. 4 and 5, and the point of tangency of the roller 88 with the sloping surface 98 of cam 102 is diagrammatically indicated at 106 in these figures. As the cams are forced apart by maximum movement of piston rod 78, the links 48 and 50 will be pivoted an angular amount equal to the difference between the angle A (FIG. 4) and the angle $A_1$ (FIG. 5). At the same time, the axis of the hydraulic cylinder and piston assembly 70 will be pivoted through an angle equal to the difference between the angle B (FIG. 4) and the angle $B_1$ (FIG. 5).

The force applied by the hydraulic cylinder and piston assembly 70 through the rollers, at the points of contact with the sloping surfaces of the cam elements, may be resolved into horizontal and vertical force vectors, and the relative slopes of the cam surfaces may be predetermined to vary the angular points of tangency of the rollers with the cams to result in a predetermined amount of lift of the platform 40 for each increment of movement of the piston rod 78. Preferably, the force required to be exerted by the hydraulic cylinder and piston assembly 70 is scheduled to remain substantially constant throughout the stroke thereof. The preferred result, therefore, is that the force output of the cylinder 70 when plotted on a curve relative to increments of lift will be a substantially straight line function.

Figure 6:
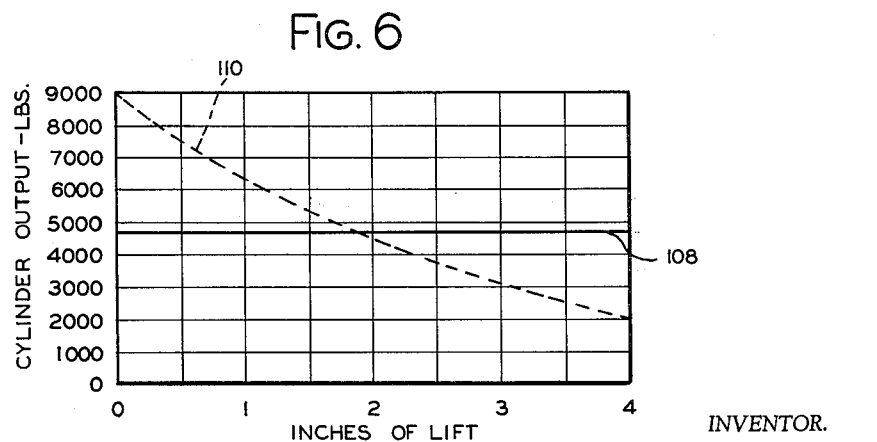
FIGURE 6 is a chart showing an illustrative comparison of the schedules of force required to be exerted by the hydraulic cylinders of the prior art arrangements and that of the present invention.

Referring to FIG. 6, there is shown a graph illustrating a comparison between the functions of a typical prior art arrangement and the arrangement of the present invention. The abscissa is scaled for representation in inches of lift, and the ordinate in pounds. As an illustrative example, let it be assumed that it is desired to produce a hand lift truck having a load lifting capacity of 4,000 pounds. The solid horizontal line 108 in the graph represents, for example, the force output of a hydraulic cylinder of 2 inch diameter operating under a fluid pressure of 1,800 p.s.i., with 80% efficiency, which will result in an available force of approximately 4,524 pounds. With the arrangement of the present invention, the relative slopes of the cams may be developed mathematically to result in an efficient application of this available force as above described so that the force is constant for any increment of lift and will, therefore, follow the line 108 of the graph in FIG. 6 which is somewhat in excess of the desired capacity thereby providing a margin of safety.

In many prior art arrangements, wherein the force of the hydraulic cylinder is applied directly to the links connecting the platform to the load supporting frame, an extremely inefficient structure is presented. That is, as the lifting action first starts, the cylinder and piston rod are working at a mechanical disadvantage since the force is exerted along the line only slightly above the pivotal axis of the links and the leverage is accordingly small. As the lift increases the leverage increases and the cylinder and piston ultimately begin to work at a mechanical advantage. This operation is shown in the graph by the dotted curve 110 which represents a typical prior art arrangement for a hand lift truck having approximately the same load lifting capacity as given in the above example, i.e., 4,000 pounds. As may be seen, when the lifting action first starts, the cylinder must exert a force of approximately 9,000 pounds and this force is gradually decreased with each increment of lift until at the end of the lift cycle a force of approximately only 2,000 pounds is required.

It will be evident from the foregoing examples that with such prior art arrangements it is necessary to provide a hydraulic cylinder and piston of very high capacity due to the inefficiency of the lifting mechanism. As a result, it is also necessary to provide operating components such as a pump, control valves, and fluid conducting lines and fittings which are capable of producing and withstanding the relatively high pressures required to effect the first movement of lift, while these same components are required to operate at only a small fraction of rated capacity to effect the final increment of lift. The resulting inefficient use of equipment and the excessive cost and size thereof will be obvious.

With the construction of the present invention it is possible, as shown by the above illustrative example, to provide a hand lift truck of the desired load capacity which requires a hydraulic cylinder and piston of greatly reduced capacity (approximately one-half the capacity required by said prior art devices). The operating components such as the pump, control valves, and fluid conducting lines and fittings can, accordingly, be of considerably reduced size and capacity. As a result, the hand lift truck of the present invention can be produced at a very substantial savings in cost of manufacture, and will be substantially more compact than those of the prior art.

It should be pointed out that the shape of the cam elements 92, 100 and 102 have a pronounced effect on the force required to be exerted by the hydraulic piston and cylinder assembly 70 and that they can be contoured to produce any desired relationship, within limits, of lift versus cylinder force. Also, if it is desired to lift a predetermined load with a relatively small force, the cam elements will be made relatively long, with the result that the stroke of the piston rod will be relatively long and the force required will be relatively small.

While the present invention has been herein described by way of reference to one particular illustrative embodiment thereof as shown in the drawings, it will be obvious to those skilled in the art that various alternative arrangements and embodiments thereof may be produced without departing from the spirit of the invention. For example, the number of cam elements and rollers may be varied to suit individual requirements of any particular design. The placement and relative number of cam elements on the platform and the load supporting framework can also be varied to meet the requirements of any particular design. The present invention is, therefore, not intended to be limited to the particular embodiment shown and described, nor otherwise than by the terms of the appended claims.

I claim:

1. In an industrial truck of the character described, the combination of a longitudinally extending load supporting frame, a longitudinally extending and vertically movable load receiving platform overlying said frame and abutting the upper surface thereof when the platform is lowered, a first pair of transversely spaced parallel links pivotally connected at opposite ends thereof to said platform and to said frame at the forward ends of said platform and frame, respectively, a second pair of transversely spaced parallel links pivotally connected at the opposite ends thereof to said platform and to said frame at the rearward ends of said platform and frame, respectively, said first and second pairs of links together forming a parallelogram linkage means for permitting vertical movement of the platform in a plane parallel to the frame, first cam means secured in depending relationship to said platform transversely centrally thereof, second cam means secured to said frame in upstanding closely spaced transverse relationship to said first cam means, said first and second cam means having oppositely inclined surfaces, the surface of one of said cam means curving along a predetermined contour, hydraulic extensible ram means pivotally mounted upon said frame at one end thereof and extending longitudinally and generally centrally of said frame, a relatively short cross-shaft secured to the opposite end of said ram means, and first and second closely transversely spaced roller means rotatably mounted upon said cross-shaft, said first and second roller means engaging and wedging vertically apart said first and second cam means, respectively, during extending movement of said ram means whereby to actuate said platform vertically and parallel relative to said frame.

2. The combination as specified in claim 1, wherein said first cam means comprises a single cam element, said second cam means comprises a pair of cam elements in close transverse straddling relation to said single cam element, said first roller means comprises a single roller element engaging said single cam element, and said second roller means comprises a pair of roller elements in close transverse straddling relation to said pair of roller elements and engaging said pair of cam elements.

3. The combination as specified in claim 1 wherein said first and second pairs of parallel links extend diagonally upwardly and forwardly from the respective connections thereof to the frame, and said ram means comprises a cylinder-piston assembly wherein the cylinder is pivotally mounted at the forward end of said frame and the piston is connected to said cross-shaft and roller means adjacent the rear end of the frame for engaging said first and second cam means which also are mounted adjacent the rear ends of the platform and frame, respectively.

4. The combination as specified in claim 1 wherein said curved surface of said one cam means is contoured to compensate for variations in the angle of said ram means with respect to the horizontal and for variations in the angle of said pairs of parallel links with respect to the horizontal during actuation of said platform by said ram means such that the force required to be exerted by said ram means is substantially constant during such actuation of said platform.

References Cited in the file of this patent

UNITED STATES PATENTS

| | | |
|---|---|---|
| 1,826,116 | Andrews | Oct. 6, 1931 |
| 2,224,166 | Stuebing | Dec. 10, 1940 |
| 2,862,689 | Dalrymple et al. | Dec. 2, 1958 |
| 2,922,533 | La Barge | Jan. 26, 1960 |
| 2,928,558 | Bamford et al. | Mar. 15, 1960 |